United States Patent
Meyer et al.

(10) Patent No.: US 6,913,049 B2
(45) Date of Patent: Jul. 5, 2005

(54) VENEER SLICING MACHINE

(75) Inventors: Jean Meyer, Friedewald (DE);
Heinrich Weppler, Ludwigsau (DE);
Armin Heiner, Hohenroda (DE)

(73) Assignee: Grenzebach-BSH GmbH, Hersfeld (DE)

(*) Notice: Subject to any disclaimer, the term of this patent is extended or adjusted under 35 U.S.C. 154(b) by 0 days.

(21) Appl. No.: 10/467,613

(22) PCT Filed: Nov. 23, 2001

(86) PCT No.: PCT/EP01/13639

§ 371 (c)(1),
(2), (4) Date: Aug. 6, 2003

(87) PCT Pub. No.: WO02/066213

PCT Pub. Date: Aug. 29, 2002

(65) Prior Publication Data

US 2004/0094232 A1 May 20, 2004

(30) Foreign Application Priority Data

Feb. 16, 2001 (DE) .......................... 101 07 255

(51) Int. Cl.$^7$ .............................. B27L 5/00; B27M 1/00
(52) U.S. Cl. ...................... 144/364; 144/380; 144/178; 144/209.1
(58) Field of Search ................................ 144/364, 380, 144/162.1, 178, 209.1–215

(56) References Cited

U.S. PATENT DOCUMENTS

| 2,862,532 | A | | 12/1958 | Johnson et al. |
|---|---|---|---|---|
| 4,089,354 | A | | 5/1978 | Cremona |
| 4,587,616 | A | | 5/1986 | Weil |
| 4,601,317 | A | | 7/1986 | Brand |
| 5,511,598 | A | * | 4/1996 | Brand .......................... 144/356 |
| 5,680,887 | A | * | 10/1997 | Brand .......................... 144/178 |

FOREIGN PATENT DOCUMENTS

| CH | 401 730 | 5/1966 |
|---|---|---|
| DE | 1 928 152 | 9/1970 |
| DE | 25 48 164 | 12/1976 |
| DE | 25 58 387 | 7/1977 |
| DE | 29 28 109 | 1/1981 |
| EP | 0 127 175 | 12/1984 |
| FR | 1 238 130 | 6/1960 |
| TW | 265296 | 12/1995 |

* cited by examiner

Primary Examiner—Allen Ostrager
Assistant Examiner—Shelley Self
(74) Attorney, Agent, or Firm—Herbert Dubno; Andrew Wilford

(57) ABSTRACT

The invention relates to a veneer slicing machine. The output of prior art veneer slicing machines is limited by virtue of the fact that the slideways quickly heat up at a maximum stroke rate. As a result, the maximum permissible temperature of 120° C. is quickly reached thereby making it necessary to shut down the machine in order to permit the slideways to cool. The inventive veneer slicing machine should be able to be used in continuous operation at a maximum stroke rate and thus function without resulting in a loss in quality. To this end, cooling means are arranged on the slideways (16) and are provided in said slideways (16) e.g. in the form of borings (21) through which the coolant circulates whereby enabling heat to be carried away in a well-directed manner.

7 Claims, 4 Drawing Sheets

VENEER SLICING MACHINE

CROSS REFERENCE TO RELATED APPLICATIONS

This application is the US national phase of PCT application PCT/EP01/13639, filed 23 Nov. 2001, published 29 Aug. 2002 WO 02/066213, and claiming the priority of German patent application 10107255.4 itself filed 16 Feb. 2001.

FIELD OF THE INVENTION

The invention relates to a veneer-slicing machine having a reciprocal table to which a flitch is clamped, the table being slidable on guide rails, and a tool slide carrying a pressure plate and a blade and reciprocal along a line perpendicular to a movement plane of the table.

BACKGROUND OF THE INVENTION

In a typical veneer-slicing machine, as for example known from EP 0,127,175, the table to which the flitch to be sliced is clamped moves up and down in a vertical plane. To this end the table is guided by means of guide rails and shoes. A slice of veneer is cut from the flitch, e.g. as it moves downward, by an upwardly directed blade. The blade is mounted together with a pressure plate on a tool support that is normally stationary during the cutting operation. For each cycle of the table movement the tool support is advanced toward the flitch through a distance equal to the thickness of the veneer slice.

German 2,548,164 describes a veneer-slicing machine with a vertically or nearly vertically movable table that when used reciprocates vertically with a flitch clamped to it. A tool carriage with a blade and pressure plate as well as a conveyor belt for carrying off the veneer slices is movable at a right angle to the table. The cutting edge of the blade is directed downward. The cutting is done during upward movement of the table.

Veneer-slicing machines with different arrangements of the table and blade are also known.

German 1,928,152 describes a veneer-slicing machine that is set at an angle. In this machine the rod- and blade-carrying system, that is the tool slide, is reciprocal on tie rods and two guides and rails are provided. The bed holding the flitch, that is the table, is stationary.

German 2,558,487 describes a veneer-slicing machine that is horizontal. A frame carries a horizontal table with clamps for holding a flitch and above it a horizontally reciprocal blade. The blade and its holder and a pressure plate ride on rail-like guides.

In these known veneer-slicing machines for each reciprocation (stroke) of the flitch a slice of veneer is produced. The maximum cycling rate is about 90/min; in which case the guides and their rails get quite hot from friction. Higher temperatures than about 120° C. are bad for the guides and their rails as they can lead to damage caused by for example destruction of the lubricant film or thermal deformation.

The heat thus produced is only dissipated in known systems by convection and lubricants. Thus when used at maximum speed the machine must be shut down periodically, during which time the guides and their rails cool off. This leads once again to a reduction in the output of the veneer-slicing machine.

In order to increase the output capacity of a veneer-slicing machine, German 2,928,109 suggests mounting two blades and pressure plates on a single blade support so that with each stroke two veneer slices are cut off the flitch. This apparatus has however several disadvantages. Very large forces must be applied so that the machine must be very robustly constructed. Furthermore it only works well when oriented horizontally or nearly horizontally, because otherwise there are problems moving out the overlapping veneer slices.

OBJECT OF THE INVENTION

It is an object of the invention to provide a veneer-slicing machine whose output is improved by increasing the maximum cycling rate with uninterrupted operation and to increase the service life of the guides and their rails while still producing high-quality veneer slices.

SUMMARY OF THE INVENTION

This object is achieved in that means is provided for cooling the guide rails.

The cooling means can carry off the exact frictional heat generated. As a result there is no limit to the full-load cycling time so that one can operate continuously at top speed and thus increase the output of the machine. At the same time, as a result of the lower temperature of the guide rails, wear of the guide rails and the guide shoes is reduced, so that less repairs and maintenance are needed.

A further advantage of the invention is that one can operate with less play between the guide rails and the slide shoes. As a result it is possible to improve the precision of blade movement and thus maintain the quality of the veneer to the desired high level. Finally lubrication needs of the guide rails are reduced.

The provision of bores in the guide rails according to claim 2 makes it possible to use efficient heat-exchange media such as water or coolant.

The adjustability of the amount of coolant circulated according to claims 3 to 5 allows cooling to be matched to requirements.

BRIEF DESCRIPTION OF THE DRAWING

The invention is further described with reference to a simplified embodiment of a veneer-slicing machine with a vertical table mount. Therein.

SPECIFIC DESCRIPTION

Figure 1:
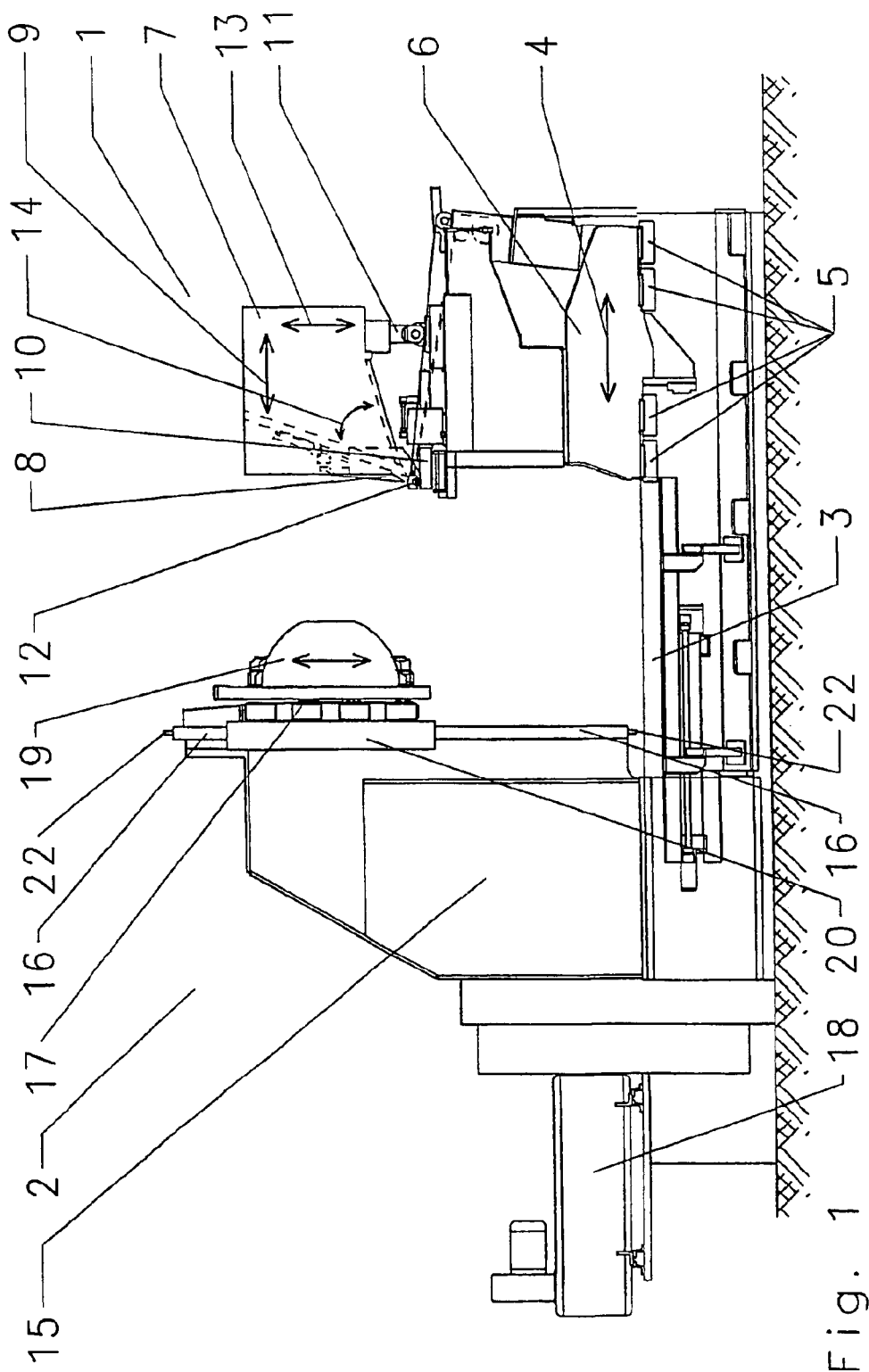
FIG. 1 is a schematic side view of a veneer-slicing machine.

A tool slide 1 is reciprocal on two horizontal and parallel rails 3 as shown by arrow 4. To this end the tool slide 1 has guides 5 that are fixed on a machine frame 6 and that slide with minimal play and no twisting on the rails 3.

Above the machine frame 6 is a blade support 7 with a blade 8 that is vertically adjustable as shown by arrow 13, movable in the direction of arrow 9, and pivotal about a downwardly directed cutting edge of the blade 8 as shown by arrow 14. The blade 8 is mounted on a side of the blade carrier 7 that confronts a table assembly 2. The blade carrier 7 can be moved relative to the machine frame 6 as indicated by arrows 9, 13, and 14, as is necessary for adjusting its position with respect to a pressure plate 12 described below, by various hydraulic cylinders of which for clarity of view only two are shown at 10 and 11.

Below the blade 8 and parallel to it on the machine frame 6 is a pressure plate 12. The pressure plate 12 and blade 8 are set such that in use they are spaced slightly apart.

The machine frame 6 carries further unillustrated devices for carrying off a slice of veneer.

Figure 2:
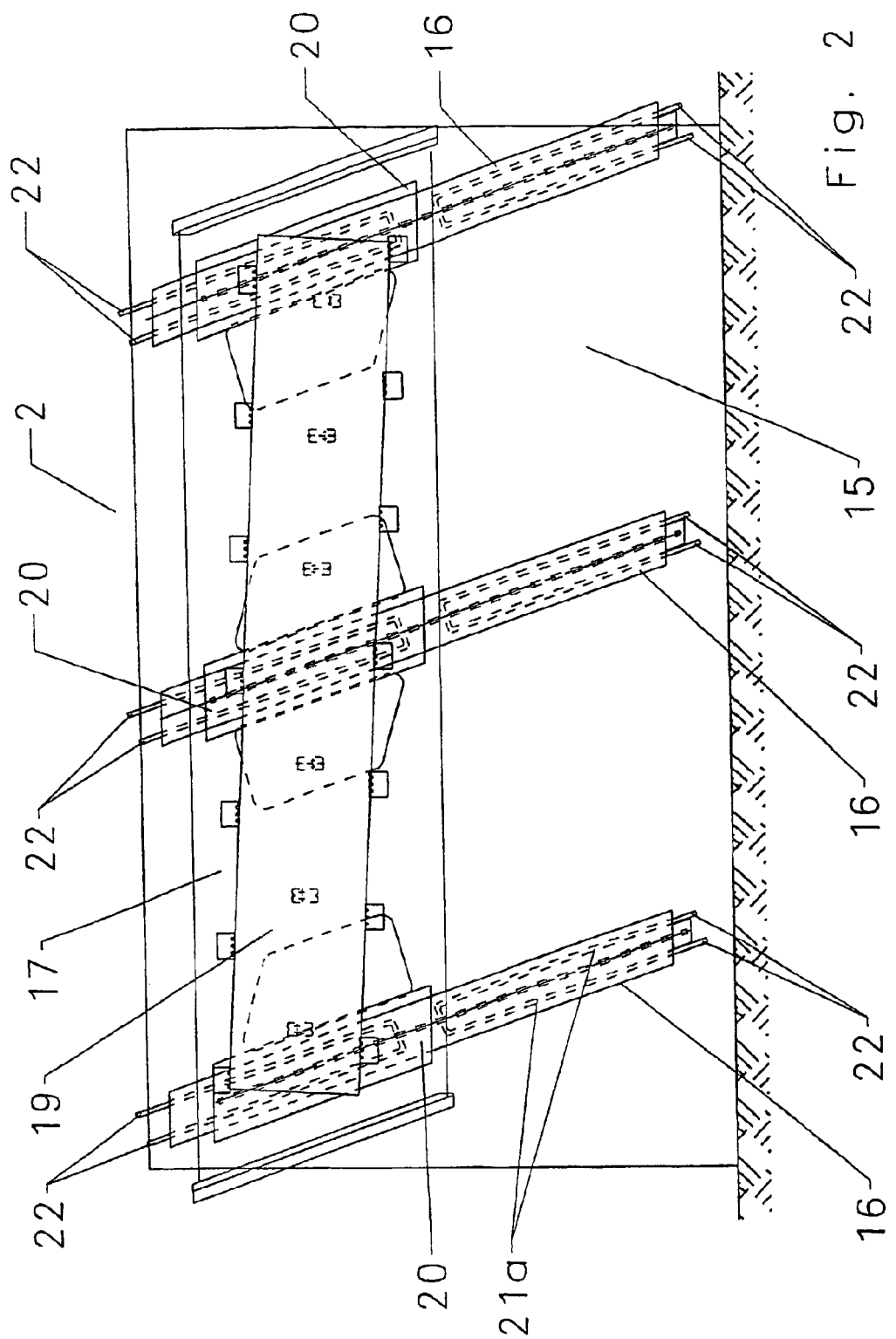
FIG. 2 is a view of the table of FIG. 1.

The table assembly 2, which is shown in FIG. 2, is basically formed by a machine frame 15, guide rails 16 that are fixed to the machine frame 15, a table 17, and a drive motor 18. The table assembly 2 is fixed to the floor and positioned relative to the tool slide 1 such that the cutting edge of the blade 8 and the table face to which a flitch 19 is clamped are parallel. The guide rails 16 are fixed on the machine frame 15. They each form with the vertical an acute angle, and their faces turned away from the machine frame 15 lie in a plane. The table 17 is secured by slide shoes 20 each formed by several parts on the guide rails 16 and is vertically reciprocal in a vertical plane along the guide rails 16. The flitch 19 is as is standard clamped by unillustrated hydraulic claws to the table 17.

The above structure of the veneer-slicing machine corresponds to the state of the art.

Figure 3:
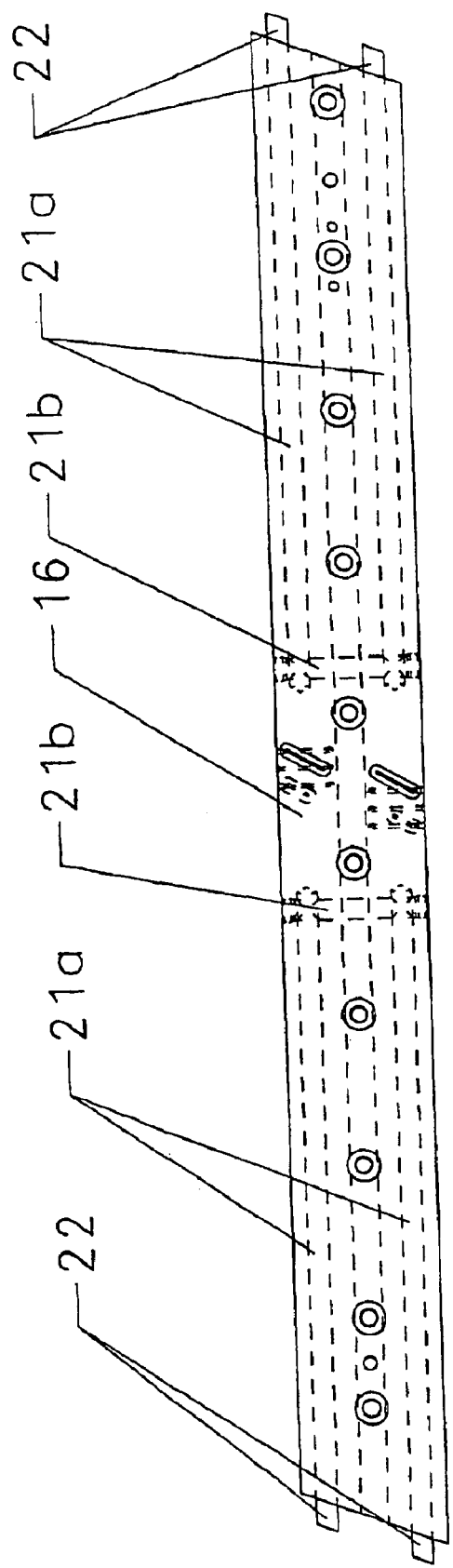
FIG. 3 is a front view of a guide rail shown horizontally and in enlarged scale.
Figure 4:
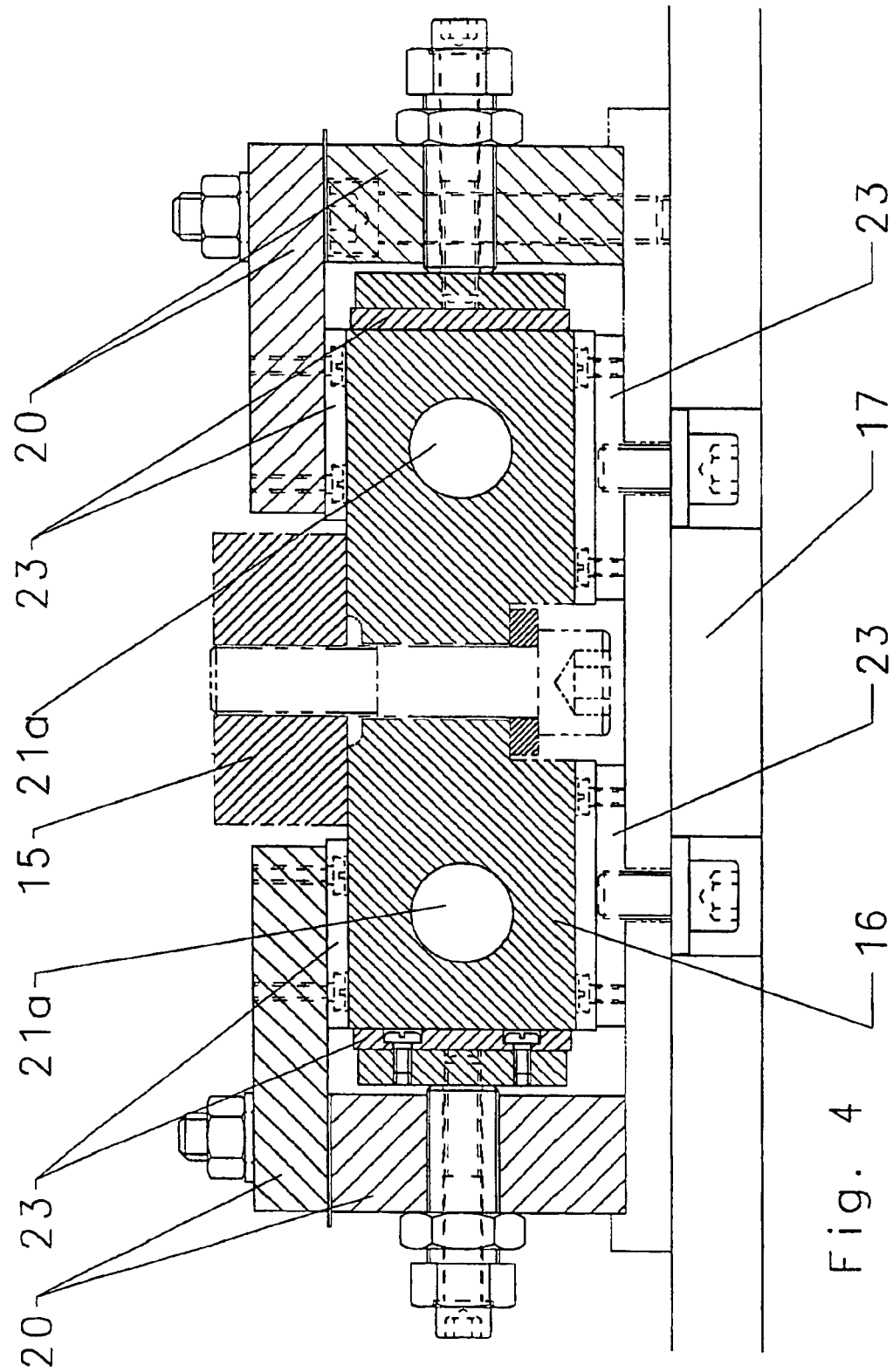
FIG. 4 is a cross-sectional detail view of the guide and its rail.

As shown in FIG. 2 and in particular in FIGS. 3 and 4 cooling means are provided on the guide rails 16. The cooling means each comprise two cooling passages or bores 21a with respective connections 22 for incoming and outgoing coolant as well if necessary as unillustrated circulating, chilling, and control means for the coolant.

Each cooling bore 21a extends from one end to near to the middle of each guide rail 16, and a transverse bore 21b connects the inner ends of the bores 21a remote from the end of the guide rail 16. The connections 22 for piping or tubing are provided at the outer ends of the bores 21a.

The table 17 is slidable by means of the slide shoes 20 on the guide rails 16. The slide shoes 20 can be disconnected from the table 17. Between the slide shoes 20 and the guide rails 16 are respective wear elements 23 that are removably mounted on the slide shoes 20 so that the play between the slide shoes 20 and the guide rails 16 can be adjusted out. Here the play is set as small as possible so as to optimize the precision of the cut.

The cooling passage is made by first, for example, forming the bores 21a. The bore 21b joining the bores 21a is drilled from one longitudinal side of the guide rail 16 and the bore mouth is subsequently closed with a plug. Each bore 21a is so oriented relative to the cross section of the respective guide rail 16 that its spacing from the three adjacent side faces of the guide rail 16 is roughly equal.

In use, which is according to the prior art except for the cooling of the guide rails 16, the tool slide 1 is pulled back at first to the maximum possible spacing from the table 2, to the so-called rest position. A flitch 19 is clamped by claws to the table 17 and the tool slide 1 is advanced to a working position in which a very small horizontal gap is left between the flitch 17 and the cutting edge of the blade 8. The drive for the table 17 is started and the table 17 is moved up and down. When it is up to speed and at a lower end position of the table 17, the tool slide 1 is moved toward the flitch 19 such that during the next upward movement a slice of veneer of the desired thickness is cut off.

Once the table 17 reaches its upper end position, the tool slide 1 is pulled back slightly so that the flitch 19 does not touch it when moving back down. In the lower end position of the table 17 the tool slide 1 is again indexed back through a distance equal to the desired thickness of the veneer from the previous position. This cycle is repeated until so many veneer slices have been cut from the flitch 17 that nothing but a minimal scrap of the flitch is left.

In order to get rid of the scrap of flitch 17, the tool slide 1 is returned to the rest position. A new flitch 17 is clamped in place and the process is restarted.

During the entire duty cycle the cooling means for the guide rails 16 are operative. This means includes for example a pump, a control valve, a cooler with a fan, as well as a control unit.

What is claimed is:

1. A machine for slicing veneer from a flitch, the machine comprising:

a frame;

a plurality of generally vertically oriented and coplanar guide rails mounted on the frame;

respective shoes slidable vertically along the rails;

a table fixed to the shoes;

means for clamping the flitch to the table;

a blade support mounted on the frame adjacent the table;

a blade carried by the blade support;

drive means for vertically reciprocating the table adjacent the blade support and thereby slicing veneer from the flitch with the blade; and means for circulating a coolant through the rails and thereby actively cooling the rails.

2. A machine for slicing veneer from a flitch, the machine comprising:

a frame;

a plurality of generally vertically oriented and coplanar guide rails mounted on the frame and formed with passages;

respective shoes slidable vertically along the rails;

a table fixed to the shoes;

means for clamping the flitch to the table;

a blade support mounted on the frame adjacent the table;

a blade carried by the blade support;

drive means for vertically reciprocating the table adjacent the blade support and thereby slicing veneer from the flitch with the blade; and means, for circulating a coolant fluid through the passages and thereby actively cooling the rails.

3. The veneer slicing machine defined in claim 2 wherein each passage is U-shaped.

4. The veneer slicing machine defined in claim 3 wherein each rail is formed with two such passages opening at opposite ends of the respective rail.

5. The veneer slicing machine defined in claim 2 wherein the means for circulating includes a pump.

6. The veneer slicing machine defined in claim 5 wherein the pump is of variable throughput.

7. The veneer slicing machine defined in claim 2, further comprising a control valve connected to the passages; and control means connected to the control valve for varying coolant flow through the passages.

* * * * *